United States Patent
Nishimaki

(10) Patent No.: US 6,998,824 B2
(45) Date of Patent: Feb. 14, 2006

(54) POWER SUPPLY CIRCUIT HAVING A DC-DC CONVERSION CIRCUIT AND AN INTERMEDIATE NODE POTENTIAL DETECTION CIRCUIT

(75) Inventor: Tatsuo Nishimaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/623,462

(22) Filed: Jul. 18, 2003

(65) Prior Publication Data
US 2004/0080303 A1    Apr. 29, 2004

(30) Foreign Application Priority Data
Jul. 24, 2002  (JP)  .............................. 2002-215246

(51) Int. Cl.
G05F 1/652 (2006.01)
G05F 1/656 (2006.01)
(52) U.S. Cl. ....................... 323/222; 323/274; 323/284
(58) Field of Classification Search ................ 323/222, 323/274, 282, 284, 272
See application file for complete search history.

(56) References Cited

U.S. PATENT DOCUMENTS

| | | | |
|---|---|---|---|
| 5,805,433 A * | 9/1998 | Wood | 363/16 |
| 5,982,160 A * | 11/1999 | Walters et al. | 323/282 |
| 6,246,220 B1 * | 6/2001 | Isham et al. | 323/224 |
| 6,791,306 B1 * | 9/2004 | Walters et al. | 323/288 |
| 6,798,180 B1 * | 9/2004 | Sase et al. | 323/282 |

FOREIGN PATENT DOCUMENTS

| | | |
|---|---|---|
| JP | 2000-092824 | 3/2000 |
| JP | 2001-037213 | 2/2001 |
| JP | 2002-526013 | 8/2002 |
| JP | 2004-023846 | 1/2004 |
| WO | 00/16469 | 3/2000 |

* cited by examiner

Primary Examiner—Bao Q. Vu
(74) Attorney, Agent, or Firm—Hogan & Hartson, LLP

(57) ABSTRACT

A power supply circuit includes a DC—DC conversion circuit including a high side transistor and a low side transistor connected in series between a power supply voltage and a reference potential and producing a voltage as PWM controlled output which is obtained by turning "on" and "off" each of the transistors with each PWM signal. The power supply circuit also includes a PWM circuit and output driver that detects a level of an intermediate node potential at a junction point of the high side transistor and the low side transistor after turning "off" the high side transistor, and turning "on" the low side transistor when the intermediate node potential becomes below or equal to a predetermined potential.

20 Claims, 8 Drawing Sheets

POWER SUPPLY CIRCUIT HAVING A DC-DC CONVERSION CIRCUIT AND AN INTERMEDIATE NODE POTENTIAL DETECTION CIRCUIT

BACKGROUND OF THE INVENTION

1. Field of the Invention

The present invention relates to power supply circuits and more particularly to power supply circuits such as synchronous rectifier type power supply circuits in which reduction of a through current is intended.

2. Prior Art

In recent years, mobile apparatuses such as cellular phones have been widely used, so that it is more frequent that batteries are used to drive a circuit serving as a load. Accordingly, it is essential that power consumption of the power supply circuits be of a small volume. Moreover, it is also necessary that the power supply circuits are capable of speedily responding to load variations.

It will be required to provide stabilized direct-current power supplies using low voltage with low power consumption as electronic apparatuses using integrated circuits become more popular.

A power supply is stabilized by the switching operation of turning "on" and "off" a transistor in accordance with changes in the load and an input, such that wasteful consumption of power can be restrained. Consequently, the efficiency of the power supply can be very much enhanced. In other words, the power supply can be stabilized by varying an "on" period (or an on-duty) of the transistor. Such efficient power supply circuits include synchronous rectifier type switching regulators using complementary metal oxide semiconductor (CMOS) integrated circuits.

The configuration of the CMOS integrated circuit employs a combination of two kinds of metal oxide semiconductor transistors, an N channel transistor (hereinafter abbreviated as NMOS) and a P channel transistor (hereinafter abbreviated as PMOS). Because of its characteristic of low power consumption, the CMOS integrated circuit is a mainstream of the large scale integration technology.

FIG. 13 shows a configuration of a synchronous rectifier type-switching regulator using a CMOS integrated circuit.

In FIG. 13, the configuration of the power supply circuit includes a synchronous rectifier type switching regulator circuit with a high-side PMOS (hereinafter referred to as high side transistor) (QP1) and a low-side transistor (hereinafter referred to as low side transistor) (QN1), for outputting a direct current voltage VOUT, which is a DC voltage and an alternate current voltage, by alternately turning "on" and "off" the transistors. The circuit also includes an error amplifier 40 for producing an error signal by comparing an output voltage of the switching regulator circuit to a reference voltage value of a reference voltage supply E; a Pulse Width Modulation (PWM) circuit 32 for controlling the output of the switching regulator circuit to be constant by controlling the pulse width of a PWM signal based on the error signal; and an output driver 31 for receiving an input of the PWM signal of the PWM circuit 32 and forming gate pulses SH and SL to be supplied to the high side transistor (QP1) and the low side transistor (QN1), respectively, of the switching regulator circuit. Here, the PWM circuit 32 and the output driver 31 form a PWM means.

The switching regulator circuit is configured such that the high side transistor (QP1) and the low side transistor (QN1) are connected in series, having a drain D in common between a terminal 1 to which direct current voltage VIN (=power supply voltage VDD, for example, 4V), i.e. an input voltage, is supplied and a terminal 2 to which a reference potential VSS (=ground potential GND, for example, 0V) is supplied. A source S of the high side transistor (QP1) is connected to the terminal 1 while a source S of the low side transistor (QN1) is connected to the terminal 2.

High-frequency pulses SH and SL as PWM signals are supplied to the gates of the high side transistor (QP1) and the low side transistor (QN1) from the PWM means, respectively, and, the transistors are alternately turned "on"/"off" by the high-frequency pulses SH and SL. Consequently, an alternate current voltage VMA is generated at an intermediate node K which is the junction point of the both transistors.

A rectifier coil L1 and a stabilizing capacitance C0 are connected in series between the intermediate node K where the alternate current voltage VMA is generated and a terminal 2 to which the reference potential VSS is supplied. The direct current voltage VOUT (for example, 1.5V) smoothed by the stabilizing capacitance C0 is output to an output terminal 4 connected to the junction point of the series connection so as to be supplied to a load not illustrated in the drawing.

Then, the output direct current voltage VOUT is returned to one terminal of the error amplifier 40 through a feedback line and then compared with the reference voltage value of the reference voltage supply E connected to a terminal 5 to which the reference potential VSS is supplied.

The error voltage, which is the comparison result produced by the error amplifier 40, is supplied to the PWM circuit 32, and the pulse width of the PWM signal generated by the PWM circuit 32 is controlled by the error voltage. Here, the PWM signal output from the PWM circuit 32 and the gate pulse SH as the PWM signal output from the output driver 31 are inversely related.

Regarding the control of the high-side transistor (QP1) and the low-side transistor (QN1), which are connected in series between the power supply voltage VIN and the reference potential VSS as described above, it is necessary to control turning "on" one of the above transistors always after the other transistor is turned "off". Otherwise, a through current would run between the transistors, thereby remarkably deteriorating the efficiency.

FIG. 14 shows a circuit diagram illustrating an example of a configuration of the above output driver 31.

In FIG. 14, the configuration of the output driver 31 includes an input terminal 6 to which the PWM signal from the PWM circuit 32 is input; an inverter 311; a two-input NAND gate 312; inverters 313 and 314; a two-input NAND gate 315; inverters 316 and 317; an output terminal 9 that outputs the high-frequency pulse SH which will be the gate signal of the high side transistor (QP1); and an output terminal 10 that outputs the high-frequency pulse SL which will be the gate signal of the low side transistor (QN1).

According to this logic structure, when the PWM signal input to the input terminal 6 is low, the SH signal of the output terminal 9 is high, two inputs of the two-input NAND gate 315 are both high, and the SL signal of the output terminal 10 is high. Moreover, when the PWM signal input to the input terminal 6 is high, the output of the two-input NAND gate 315 is high and the SL signal of the output terminal 10 is low while two inputs to the two-input NAND gate 312 are both high and the SH signal of the output terminal 9 is low. The output driver 31 with the above configuration employs a so called 'cross' logic style. This 'cross' logic prevents the high side transistor (QP1) and the low side transistor (QN1), which are connected in series between the power supply voltage and the reference potential, from turning "on" simultaneously caused by the time delay between logic elements. Hence, a through current is prevented from running between the transistors.

However, with the structure of the output driver shown in FIG. 14, it has been difficult to prevent the through current from running from the high-side to the low-side due to the gate capacities and the speed of response of power MOS transistors constituting the high side and the low side transistor. Namely, it has been difficult to eliminate the through current depending on the characteristic and the type of power MOS transistor.

In light of the above problem, the present invention aims to provide a power supply circuit capable of preventing the through current and enhancing the conversion efficiency.

SUMMARY OF INVENTION

A power supply circuit of the present invention includes a DC—DC conversion circuit including a high side transistor and a low side transistor connected in series between a power supply voltage and a reference potential and producing a direct current output voltage as a PWM controlled output which is obtained by turning "on" and "off" each of the transistors with each PWM signal. The circuit also includes a PWM means and a detection means. The detection means detects a level of an intermediate node potential at a junction point of the high side transistor and the low side transistor after turning "off" the high side transistor, and turning "on" the low side transistor when the intermediate node potential becomes below or equal to a predetermined potential.

With the structure of the invention, the intermediate node potential continues to drop when the high side transistor is turned "off", and the low side transistor is turned on when the intermediate node potential becomes below or equal to the predetermined potential. Consequently, the low side transistor can be turned on after the high side transistor is completely turned "off", and there is no chance for a through current to run between the high side transistor and the low side transistor when the high side transistor is turned "off".

Further, a power supply circuit of the present invention includes a DC—DC conversion circuit including a high side transistor and a low side transistor connected in series between a power supply voltage and a reference potential and producing a direct current output voltage as a PWM controlled output which is obtained by turning "on" and "off" each of the transistors with each PWM signal. The circuit also includes an error detection means for obtaining an amount of error by comparing the output from the DC—DC conversion circuit to a predetermined reference voltage value. A PWM means is provided for producing a PWM signal of which a pulse width is controlled by the amount of error, supplying the PWM signal to each gate of the transistors in the DC—DC conversion circuit; including a detection means, which detects a level of an intermediate node potential at a junction point of the high side transistor and the low side transistor after the high side transistor is turned "off", and turning "on" the low side transistor when the intermediate node potential becomes below or equal to a predetermined potential.

With the structure of the invention, the intermediate node potential continues to drop when the high side transistor is turned "off", and the low side transistor is turned "on" when the intermediate node potential becomes below or equal to the predetermined potential, so that the low side transistor can be turned "on" after the high side transistor is completely turned "off". Consequently, there is no chance for a through current to run between the high side transistor and the low side transistor when the high side transistor is turned "off".

Also, in the invention, the detection means included in the PWM means preferably outputs a signal for turning "on" the low side transistor when detecting the intermediate node potential lowered to a predetermined potential, which is sufficiently low with respect to the power supply voltage.

With the structure, a time delay can be generated in order for the intermediate node potential to drop to the sufficiently low potential, and it is possible to turn "on" the low side transistor unfailingly after the high side transistor is turned "off".

Moreover, in the invention, the detection means included in the PWM means preferably receives the intermediate node potential at a (VDD/2) type logic circuit when setting the power supply voltage to VDD and the reference potential to zero. The detection means then preferably outputs a signal for turning "on" the low side transistor when detecting the intermediate node potential lowered to a potential below or equal to (VDD/4).

With the structure, the intermediate node potential can be received by the 2V type logic circuit when VDD is set to 4V, and the low side transistor can be turned "on" when the intermediate node potential lowers to a potential below or equal to 1V. Accordingly, it is possible to turn "on" the low side transistor after the high side transistor is completely turned "off".

Furthermore, a power supply circuit of the present invention includes a DC—DC conversion circuit including a high side transistor and a low side transistor connected in series between a power supply voltage and a reference potential and producing a direct current output voltage as a PWM controlled output which is obtained by turning "on" and "off" each of the transistors with each PWM signal. The circuit also includes an error detection means for obtaining an amount of error by comparing the output from the DC—DC conversion circuit to a predetermined reference voltage value. The circuit further includes a PWM means, for producing a PWM signal of which a pulse width is controlled by the amount of error, supplying the PWM signal to each gate of the transistors in the DC—DC conversion circuit, including a first detection means, which detects a level of an intermediate node potential at a junction point of the high side transistor and the low side transistor after the high side transistor is turned "off", including a second detection means, which detects a level of a PWM signal to be supplied to the gate of the low side transistor out of the PWM signals to be supplied to the DC—DC conversion circuit, turning "on" the low side transistor when the first detection means detects the intermediate node potential lowered below or equal to a predetermined potential, and turning "on" the high side transistor after the second detection means detects the level of the PWM signal to be supplied to the gate of the low side transistor lowered below or equal to a predetermined potential.

With the structure of the invention, the low side transistor is turned "on" when the intermediate node potential becomes below or equal to the predetermined potential after the high side transistor is turned "off" during an operation of alternately turning "on" the high side transistor and the low side transistor. Therefore, the low side transistor can be turned "on" after the high side transistor is completely turned "off". Further, the high side transistor is turned "on" after the low side transistor is turned "off", so that the high side transistor can be turned on after the low side transistor is completely turned "off". Therefore, the high side transistor and the low side transistor never turn "on" simultaneously, and there is no chance for a through current to run between the high side transistor and the low side transistor both at the time of the high side transistor being "off" and the time of the low side transistor being "off".

Moreover, in the invention, the first detection means included in the PWM means outputs a signal for turning "on" the low side transistor when detecting the intermediate node potential lowered to the predetermined potential which is sufficiently low with respect to the power supply voltage, and the second detection means included in the PWM means outputs a signal for turning "on" the high side transistor when detecting the PWM signal to be supplied to the gate of the low side transistor lowered to the predetermined potential which is sufficiently low with respect to the power supply voltage.

With the structure, a time delay can be generated in order for the intermediate node potential to be lowered to the sufficiently low potential, and the low side transistor can be turned "on" unfailingly after the high side transistor is turned "off". Moreover, a time delay can be generated in order for the PWM signal to be supplied to the gate of the low side transistor to lower the low side transistor to the sufficiently low potential, and the high side transistor can be turned "on" unfailingly after the low side transistor is turned "off".

Furthermore, in the invention, the first detection means included in the PWM means receives the intermediate node potential at a (VDD/2) type logic circuit when setting the power supply voltage to VDD and the reference voltage to zero and outputs a signal for tuning "on" the low side transistor when detecting the intermediate node potential lowered to a potential below or equal to (VDD/4). The second detection means included in the PWM means receives the PWM signal to be supplied to the gate of the low side transistor at a (VDD/2) type logic circuit when setting the power supply voltage to VDD and the reference voltage to zero and outputs a signal for turning "on" the high side transistor after detecting the level of the PWM signal to be supplied to the gate of the low side transistor lowered to a potential below or equal to (VDD/4).

With this structure, when setting VDD to 4V, the intermediate node potential can be received at the 2V type logic circuit, and the low side transistor can be turned "on" when the intermediate node potential drops to a potential below or equal to 1V, so that the low side transistor can be turned "on" after the high side transistor is completely turned "off". Also, the high side transistor can be turned "on" when the level of the PWM signal to be supplied to the gate of the low side transistor drops to the potential below or equal to 1V. Therefore, the low side transistor can be turned "on" after the high side transistor is completely turned "off" while the high side transistor can be turned "on" after the low side transistor is completely turned "off".

Also, in the invention described above, the power supply circuit preferably includes a detection circuit which outputs a detection signal indicating that the intermediate node potential has exceeded the reference potential after returning from an undershoot at a level lower than the reference potential when the low side transistor is turned "on" during an "off"-period of the high side transistor. The PWM means further includes a function of turning "off" the low side transistor being in an on-state by controlling, based on a detection signal of the detection circuit, a pulse width of the PWM signal to be supplied to the gate of the low side transistor out of the PWM signals to be supplied to the DC—DC conversion circuit.

With the structure, it is possible to prevent a through current by prohibiting the high side transistor and the low side transistor to turn "on" at the same time. Also, it is possible to preclude an electric current running from the intermediate node to the reference potential side by making the intermediate node potential experience an undershoot after the high side transistor is turned "off". Therefore, wasteful electric current consumption (i.e. wasteful power consumption) can be eliminated.

DETAILED DESCRIPTION OF THE PREFERRED EMBODIMENTS

Embodiments of the invention will be described with reference to the drawings.

Figure 1:
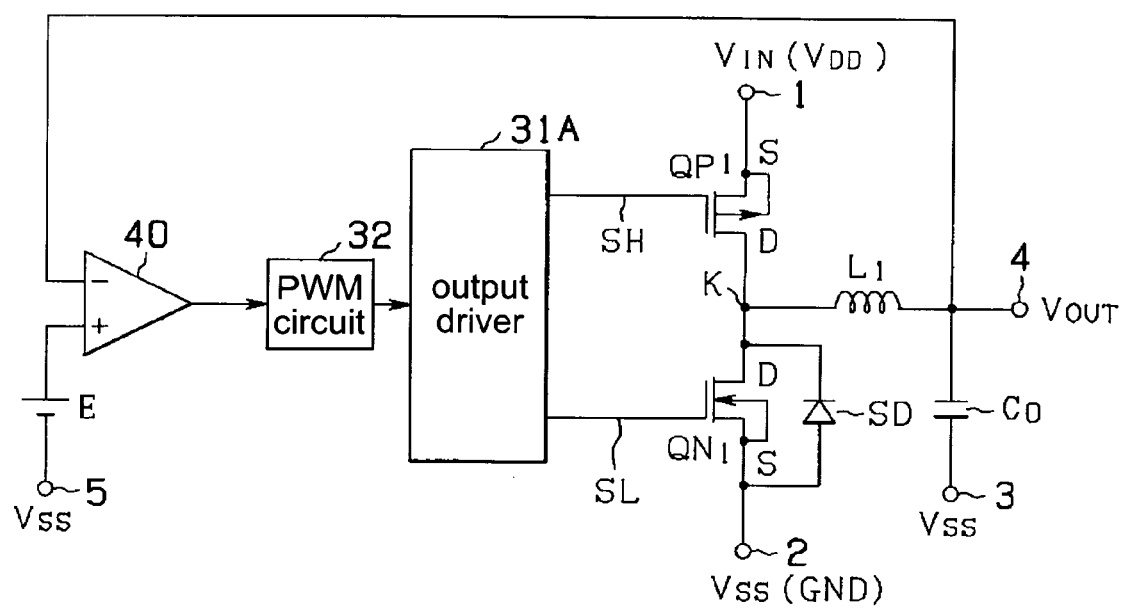
FIG. 1 is a drawing showing a configuration of a power supply circuit of the first embodiment of the present invention.

FIG. 1 shows a configuration of a power supply circuit according to the first embodiment of the invention. This embodiment illustrates a synchronous rectifier type switching regulator using a CMOS integrated circuit as an efficient stabilized direct-current power supply.

In FIG. 1, the power supply circuit includes a DC—DC conversion circuit including a synchronous rectifier type switching regulator circuit that has a high side transistor (QP1) and a low side transistor (QN1) and outputs a direct current voltage VOUT by alternately turning "on" and "off" the transistors. The circuit includes an error amplifier 40 for producing an error signal by comparing an output voltage of the DC—DC conversion circuit to a reference voltage value of a reference voltage supply E. The circuit further includes a PWM circuit 32 for controlling the output of the DC—DC conversion circuit to be constant by controlling the pulse width of a PWM signal based on the error signal. An output driver 31A is provided for receiving the input of an PWM signal from the PWM circuit 32 and then forming gate pulses SH and SL to be supplied to the high side transistor (QP1) and the low side transistor (QN1) of the DC—DC conversion circuit, respectively. The output driver 31A furthermore includes a detection means, which detects the level of a potential VMA of a junction point K (hereinafter referred to as intermediate node potential) of the high side transistor (QP1) and the low side transistor (QN1) after the high side transistor (QP1) is turned "off". Then, the output driver 31A controls turning "on" the low side transistor (QN1) when the intermediate node potential VMA becomes less or equal to a predetermined potential. Here, the PWM circuit 32 and the output driver 31A form a PWM means.

The DC—DC conversion circuit is configured such that the high side transistor (QP1) and the low side transistor (QN1) are connected in series, having a drain D in common between a terminal 1 to which a direct current voltage VIN (=power supply voltage VDD, for example, 4V), an input voltage, is supplied and a terminal 2 to which a reference potential VSS (=ground potential GND, for example, 0V) is supplied. The source of the high side transistor (QP1) is connected to terminal 1 while the source of the low side transistor (QN1) is connected to terminal 2.

High-frequency pulses SH and SL as PWM signals are supplied from the output driver 31A to the gates of the high side transistor (QP1) and the low side transistor (QN1), respectively, and the transistors are alternately turned "on"/"off" in accordance with the high-frequency pulses SH and SL. Consequently, an alternate current voltage VMA is generated at the intermediate node K which is the junction point of the transistors. Moreover, a Schottky diode SD is connected between the source and the drain of the low side transistor (QN1) so as to back up the power supply and prevent excessive voltage supplied to the low-side transistor when the low-side transistor is turned "off".

More concretely, the output driver 31A includes the detection means that detects whether the potential of the junction point of the high side transistor (QP1) and the low side transistor (QN1) (the intermediate node potential) is beyond a threshold value after the high side transistor (QP1) is turned "off" (namely, after the gate pulse SH becomes high-level). The output driver has a function of turning "on" the low side transistor (QN1) by rendering the pulse SL to be high when the intermediate node potential is below or equal to the threshold value.

A rectifier coil L1 and a stabilizing capacitance CO are connected in series between the intermediate node K where the alternate current voltage VMA is generated and a terminal 2 to which the reference potential VSS is supplied. The direct current voltage VOUT (for example, 1.5V) smoothed by the stabilizing capacitance C0 is output to an output terminal 4 connected to the junction point of the series connection so as to be supplied to a load not illustrated in the drawing.

Then, the output direct current voltage VOUT is returned to one terminal of the error amplifier 40 through a feedback line and then compared with the reference voltage value of the reference voltage supply E connected to a terminal 5 to which the reference potential VSS is supplied.

The error voltage, which is the compared result of the error amplifier 40, is supplied to the PWM circuit 32, and based on the error voltage, the pulse width of the PWM signal generated by the PWM circuit 32 is controlled. Consequently, PWM signal control is performed such that the output voltage VOUT of the DC—DC conversion circuit stays constant.

Figure 2:
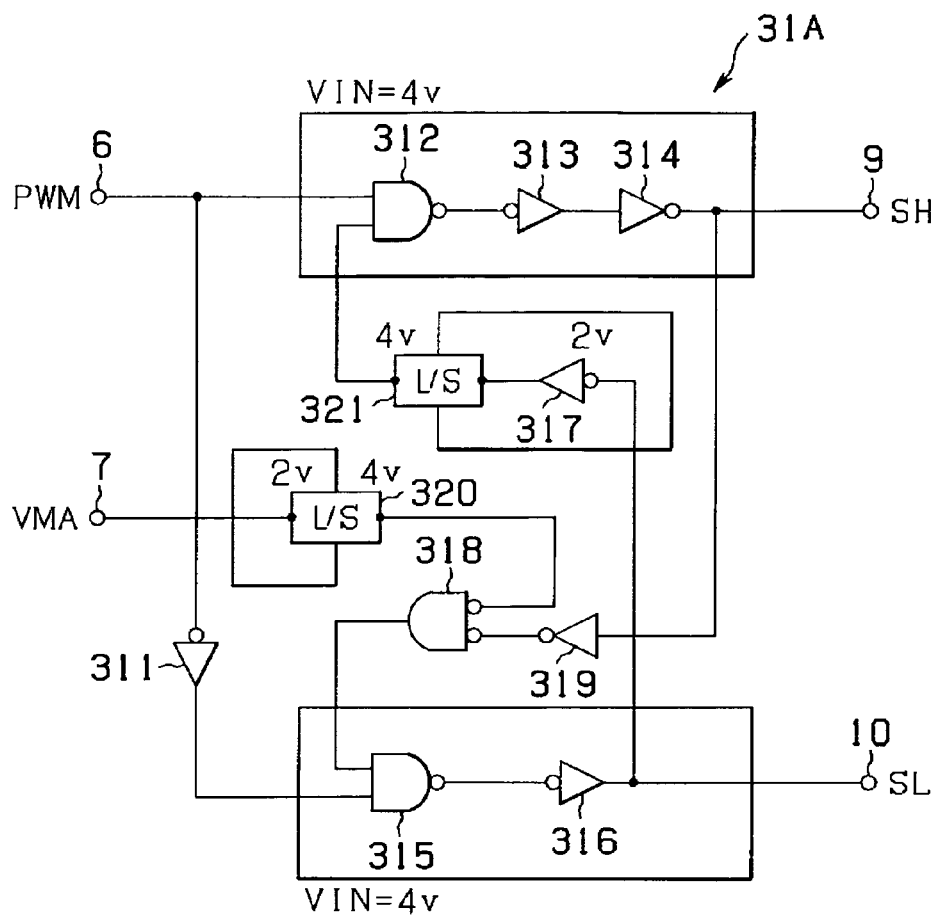
FIG. 2 is a circuit diagram showing a configuration of the output driver shown in FIG. 1.
Figure 14:
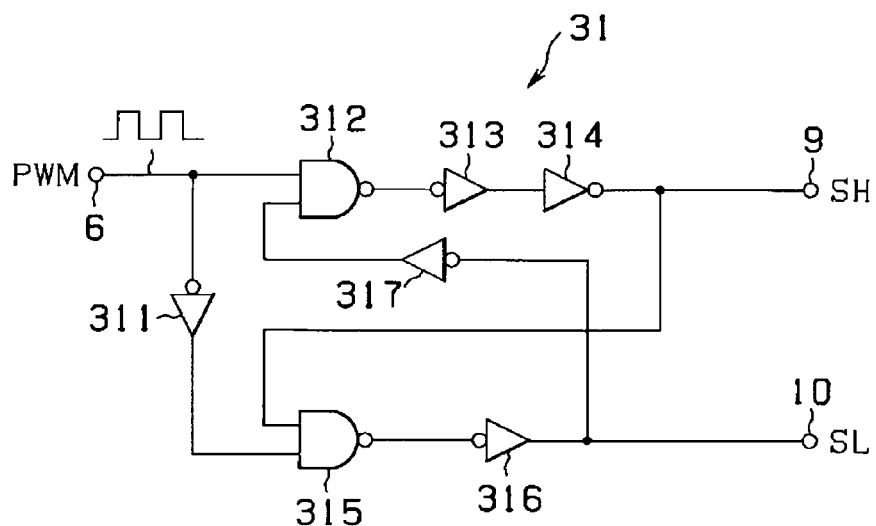
FIG. 14 is a drawing showing a configuration of the output driver shown in FIG. 13.

FIG. 2 shows a circuit diagram illustrating an example of a configuration of the output driver 31A. The parts the same as those in FIG. 14 are explained with the same reference numerals.

In FIG. 2, the output driver 31A includes an input terminal 6 to which the PWM signal (inversely related with an SH signal) from the PWM circuit 32 is input; an input terminal 7 to which the intermediate node potential VMA is input; an inverter 311; a two-input NAND gate 312; inverters 313 and 314; a two-input NAND gate 315; an inverter 316; an inverter 317; a 2V/4V level shifter (abbreviated as L/S) 321; a two-input NAND gate 318; an inverter 319; a 2V/4V level shifter (abbreviated as L/S) 320; an output terminal 9 that outputs the high-frequency pulse SH which will be a gate signal of the high side transistor (QP1); and an output terminal 10 that outputs the high-frequency pulse SL which will be a gate signal of the low side transistor (QN1).

The above two-input NAND gate 312, the inverters 313 and 314, the two-input NAND gate 315 and the inverter 316 can be categorized as 4V-type circuits to be driven with a 4V power supply voltage. The inverter 317 can be categorized as a 2V-type circuit driven with a 2V power supply voltage.

FIG. 2 is different from FIG. 14 in the following manner. The intermediate node potential VMA to be input to the input terminal 7 is first received by the 2V/4V level shifter 320 and converted to 4V type so as to be input to one input end of the two-input NAND gate 318. The pulse SH from the output terminal 9 is input to the other input end of the two-input NAND gate 318 through the inverter 319, and an output of the two-input NAND gate 318 is supplied to one input end of the 4V-type two-input NAND gate 315. Also, the 2V-type inverter 317 receives a pulse SL from the output terminal 10 and supplies the output thereof to one input end of the 4V-type two-input NAND gate 312 through the 2V/4V level shifter 321.

With this logic structure shown in FIG. 2, the SH signal of the output terminal 9 is high when a PWM signal input to the input terminal 6 is low. At that time should the intermediate node potential VMA to be input to the input terminal 7 drop to less or equal to 1V, the VMA is then converted to a voltage less or equal to 2V by the level shifter 320, so that two inputs to the two-input NAND gate 318 are both low. Accordingly, two inputs to the two-input NAND gate 315 are both high, and the SL signal of the output terminal 10 is high.

Also, when the PWM signal input to the input terminal 6 is high, an output of the two-input NAND gate 315 is high while the SL signal of the output terminal 10 is low. However, when the SL signal drops to low, an output of the 2V-type inverter 317 becomes high only after the SL signal becomes less or equal to 1V. Even if the level shifter 321 converts the level of the output to 4V-type, an output thereof is input to the two-input NAND gate 312 as high, so that two inputs to the two-input NAND gate 312 are both high while the output thereof and the SH signal of the output terminal 9 are low.

Figure 3:
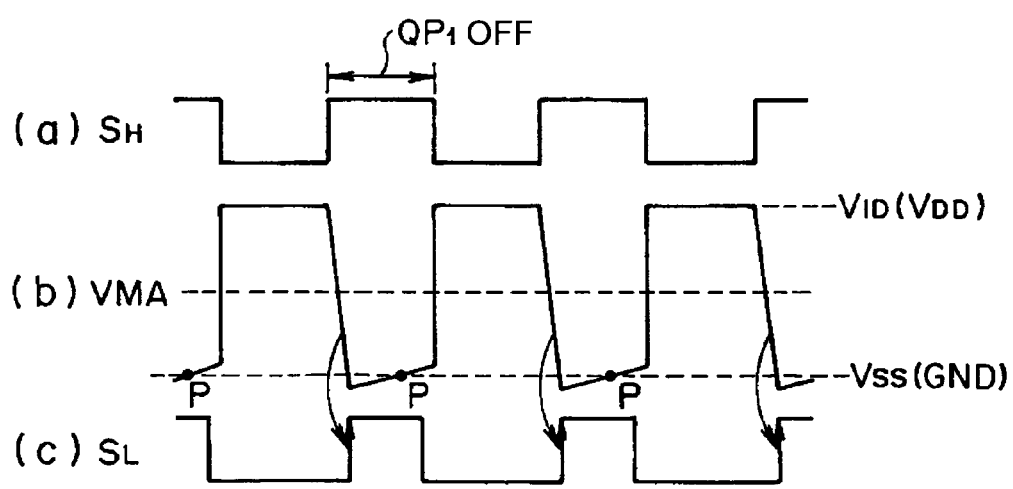
FIG. 3 is a waveform chart for illustrating operations in accordance with the output driver shown in FIG. 2.

The output driver 31A in FIG. 2 structured as above employs variations of the intermediate node potential VMA in controlling the pulse SL to be supplied to the gate of the low side transistor (QN1). As shown in FIG. 3(a), when the gate pulse SH of the high side transistor (QP1) becomes high, thereby turning "off" the high side transistor (QP1), the energy stored at the coil L1 lowers the intermediate node potential VMA in the manner shown in FIG. 3(b). After it is detected that the intermediate node potential VMA is less or equal to a certain potential (for example, when the VMA becomes less or equal to 1V which is a threshold value of the 2V-type logic circuit in the case of VDD=4V), the gate pulse SL of the low side transistor (QN1) is set to be high so as to control the low side transistor (QN1) to turn "on" as shown in FIG. 3(c).

Figure 4:
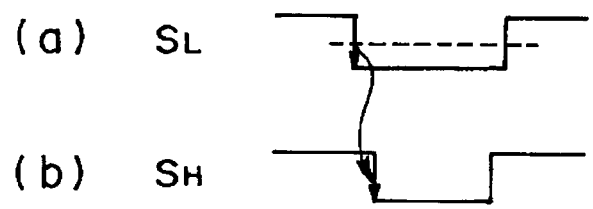
FIG. 4 is a waveform chart for illustrating operations in accordance with the output driver shown in FIG. 2.

On the contrary, regarding the high side transistor (QP1), after it is detected that the gate pulse SL of the low side transistor (QN1) is lowered below or equal to 1V as shown in FIG. 4(a), the gate pulse SH of the high side transistor (QP1) is set to be low so as to control the high side transistor (QP1) to turn "on" as shown in FIG. 4(b).

According to the first embodiment described above, it is possible to prevent the high side transistor (QP1) and the low side transistor (QN1) from simultaneously turning "on", so that a through current can be kept from running.

Figure 5:
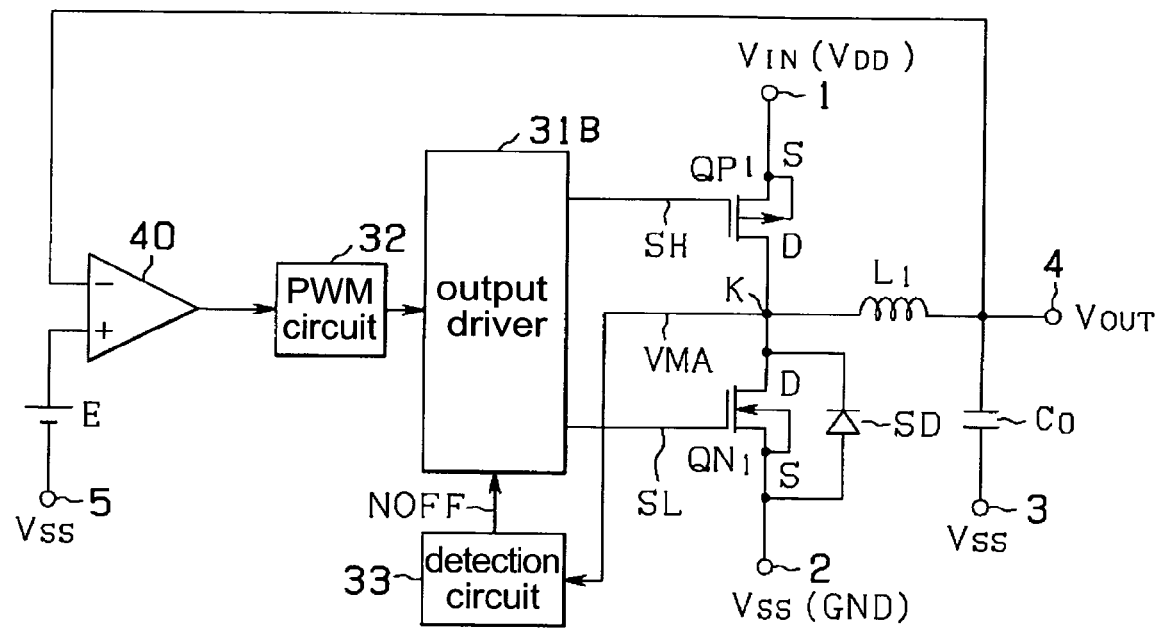
FIG. 5 is a drawing showing a configuration of a power supply circuit of the second embodiment of the invention.

FIG. 5 shows a configuration of a power supply circuit of the second embodiment according to the invention. The parts the same as those FIG. 1 in this embodiment are explained with the same reference numerals.

The power supply circuit shown in FIG. 5 is different from that of FIG. 1 as follows. The power supply circuit in FIG. 5 is provided with a detection circuit 33 that outputs a detection signal NOFF after detecting that the potential VMA of the intermediate node K has reached the VSS level and further risen after returning from an undershoot at a voltage lower than the VSS level when the low side transistor (QN1) is turned "on" during the "off"-period of the high side transistor (QP1). Moreover, an output driver 31B of the power supply circuit in FIG. 5 receives an input of the PWM signal of the PWM circuit 32 and forms the gate pulses SH and SL to be supplied to the high side transistor (QP1) and the low side transistor (QN1), respectively, of the DC—DC conversion circuit. Also, the output driver 31B includes a first function that controls the gate pulses SH and SL to prevent the high side transistor and the low side transistor from simultaneously turning "on". At the same time, the output driver 31B includes a second function that controls the low side transistor (QN1) being in an "on" state to turning "off" by controlling, based on the detection signal NOFF, the pulse width of the PWM signal SL, which is related to turning "on"/"off" of the low side transistor (QN1), in a high-level period out of the PWM signals SH and SL to be supplied to the DC—DC conversion circuit when the low side transistor (QN1) is "on" during the "off" period of the high side transistor (QP1). Here, the PWM circuit 32 and the output driver 31B form a PWM means.

More concretely, the above first function of the output driver 31B means detecting the level of the intermediate node potential VMA, for example, and controlling the low side transistor (QN1) to be turned on when the intermediate node potential VMA falls below or equal to a predetermined potential. It also means detecting the level of the PWM signal to be supplied to the gate of the low side transistor (QN1) and controlling the high side transistor (QP1) to be turned "on" when the level falls less or equal to a predetermined potential.

The above-mentioned second function of the output driver 31B compulsorily turns "off" the low side transistor (QN1) being in an "on" state when the level of the intermediate node potential VMA has exceeded the VSS level after returning from an undershoot at a voltage lower than the VSS level while the low side transistor (QN1) is turned "on" during the "off"-period of the high side transistor (QP1), as shown in FIG. 7(a) to (c). Consequently, even if the intermediate node potential VMA becomes higher than the VSS level, it is possible to prevent power consumption attributable to an electric current running from the intermediate node K side to the VSS side.

Figure 6:
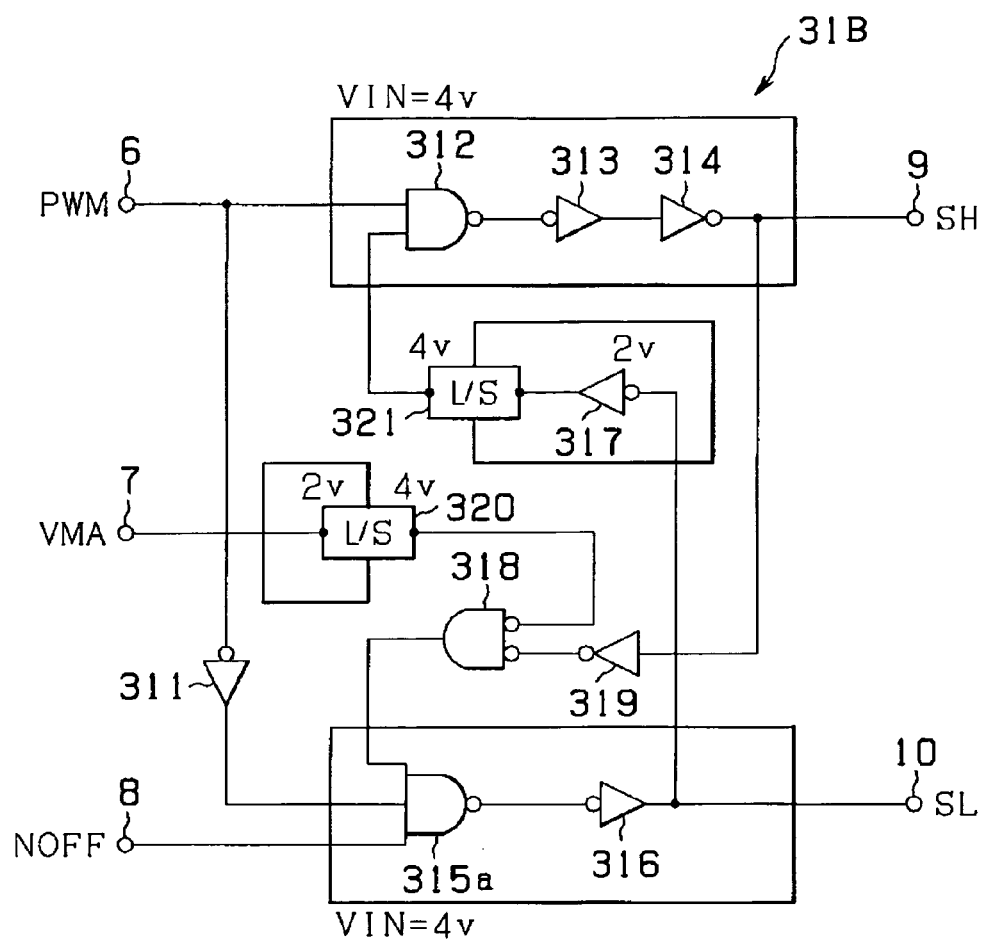
FIG. 6 is a drawing showing a configuration of the output driver shown in FIG. 5.

FIG. 6 shows an example of a configuration of the output driver 31B of FIG. 5. FIG. 6 includes a three-input NAND gate 315a replacing the two-input NAND gate 315 of the output driver 31A shown in FIG. 2. Namely, this three-input NAND gate 315a is configured by adding an input terminal 8 for receiving an input of another detection signal NOFF to the NAND gate 315 of FIG. 2. The rest of the configuration remains the same as that of FIG. 2, and thus the explanation thereof is omitted.

The configuration shown in FIG. 6 allows the output driver 31B to have the above described first and second functions. More specifically the detection signal NOFF to be input to the input terminal 8 is converted from high to low (this means that the above mentioned VMA changes to the level greater than the VSS level after undershooting at the level lower than the VSS), when the low side transistor (QN1) is turned "on" by the SH signal being high at the output terminal 10 during the "off"-period of the high side transistor (QP1) by the SH signal being high of the output terminal 9. Then, the output of the three-input NAND gate 315a becomes high so as to make the SL signal of the output terminal 10 compulsorily rendered low. Therefore, the "on" state of the low side transistor (QN1) can be compulsorily turned "off", so that it is possible to prevent power consumption attributable to an electric current running from the intermediate node K side to the VSS side even when the intermediate node potential VMA exceeds the VSS level.

The second function of this output driver 31B and the detecting circuit 33 for producing the detection signal NOFF will be described with reference to FIG. 7 to FIG. 12.

Figure 7:
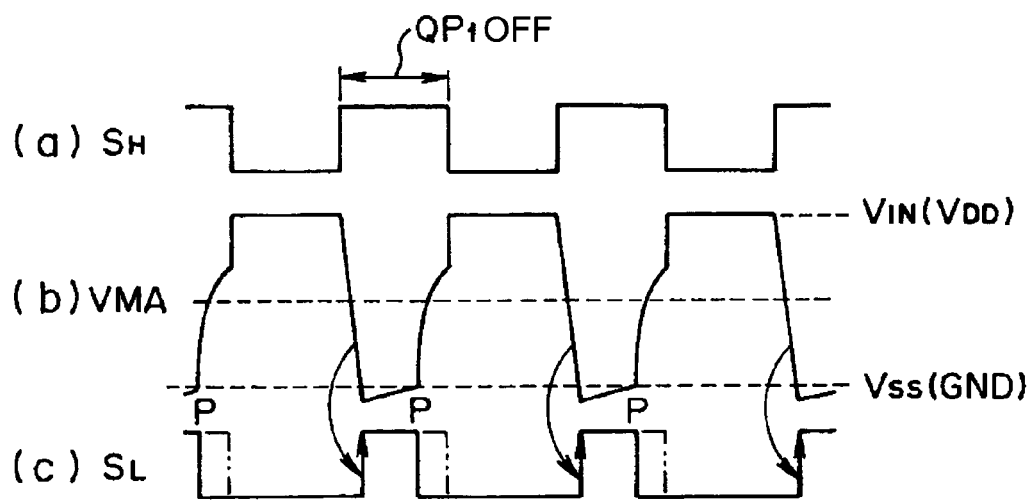
FIG. 7 is a timing chart showing changes of the PWM signals SH and SL and those of the intermediate node potential VMA shown in FIG. 5.
Figure 8:
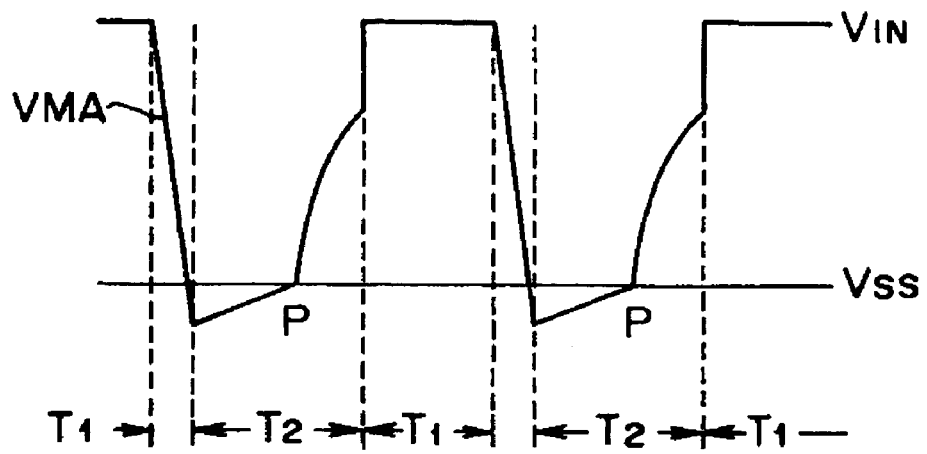
FIG. 8 is an enlarged view showing the enlarged FIG. 7(b).
Figure 9:
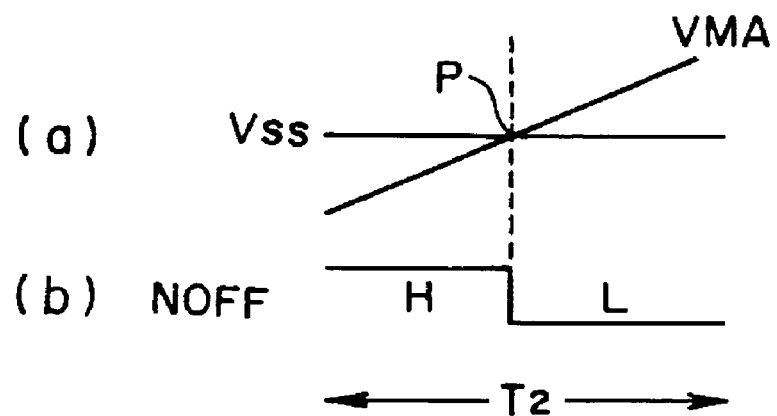
FIG. 9 is a timing chart showing the relationship among the reference potential VSS, the intermediate node potential VMA and a detection signal "OFF" of a detection circuit.

FIG. 7 is a timing chart illustrating variations of the PWM signals SH and SL and the intermediate node potential VMA shown in FIG. 5. FIG. 7(a) shows the PWM signal SH, FIG. 7(b) shows the intermediate node potential VMA, and FIG. 7(c) shows the PWM signal SL. FIG. 8 is an enlarged view of FIG. 7(b). FIG. 9 is a timing chart showing the relationship among the reference voltage VSS, the intermediate node potential VMA and the detection signal NOFF of the detection circuit 33. FIG. 9(a) shows changes of the intermediate node potential VMA with respect to the reference potential VSS when the low side transistor is "on" while the high side transistor is "off" (at the time of light load). FIG. 9(b) shows the detection signal NOFF produced by the detection circuit 33 based on the VMA and VSS.

High-frequency pulses SH and SL as PWM signals are supplied from the PWM means to the gates of the high side transistor (QP1) and the low side transistor (QN1), respectively, and the MOS transistors are alternately turned "on" and "off" by the high-frequency pulses SH and SL. During a period of the high side transistor (QP1) being "on" and the low side transistor (QN1) being "off", an electric current based on the direct current voltage VIN (=VDD) from a power supply is flown into the stabilizing capacitance CO through the coil L1. Accordingly, as shown in FIG. 7(b), the intermediate node potential VMA becomes the direct current voltage VIN (=VDD). Moreover, when the high side transistor (QP1) is turned "off" while the low side transistor (QN1) is turned "on", the intermediate node potential VMA rises after experiencing an undershoot to the level slightly lower than the reference potential VSS=GND). Then, the VMA intersects with the VSS level at a point P and exceeds the VSS (=GND), further rising linearly.

The VMA voltage changes during the "off"-period of the high side transistor (QP1) are as illustrated in FIG. 8. After the VMA returns back from the undershoot at a voltage lower than the VSS level in the period T2 which comes after turning "on" the low side transistor (QN1) in the "off"-period of the high side transistor (QP1), the low side transistor (QN1) is compulsorily turned "off" based on the detection signal NOFF, so that the VMA voltage precipitously rises. Consequently, the intermediate node voltage VMA keeps a constant level of VIN (=VDD) during the period T1 that the high side transistor (QP1) is on.

As shown in FIG. 9(a) and FIG. 9(b), as the detection signal NOFF, the detection circuit 33 outputs a high signal (H) when the intermediate node potential VMA is lower than the level of the reference potential VSS in the period T2 while outputting a low signal (L) when the VMA rises and exceeds the VSS level.

Upon receipt of the detection signal NOFF of FIG. 9(b) in the period the T2, the output driver 31B takes the pulse SL down at the timing of P point to change the pulse width shown as a double-dotted and dashed line in FIG. 7(c) to another pulse width shown as a solid line in this figure. Consequently, the period for the low side transistor (QN1) to be "on" shortens, however, the output voltage VOUT supplied to a load, not shown in the drawing, is determined mainly depending on a charging voltage stored into the stabilizing capacitance C0 during the "on" period of the high side transistor (QP1). Therefore, varying the length of the "on" period of the low side transistor (QN1) would hardly affect the operation. It is rather more advantageous to have an effect of preventing power loss, which occurs due to an electric current running from the intermediate node K (thus stabilizing capacitance C0) to the reference potential VSS side during the "on"-period of the low side transistor (QN1).

Figure 10:
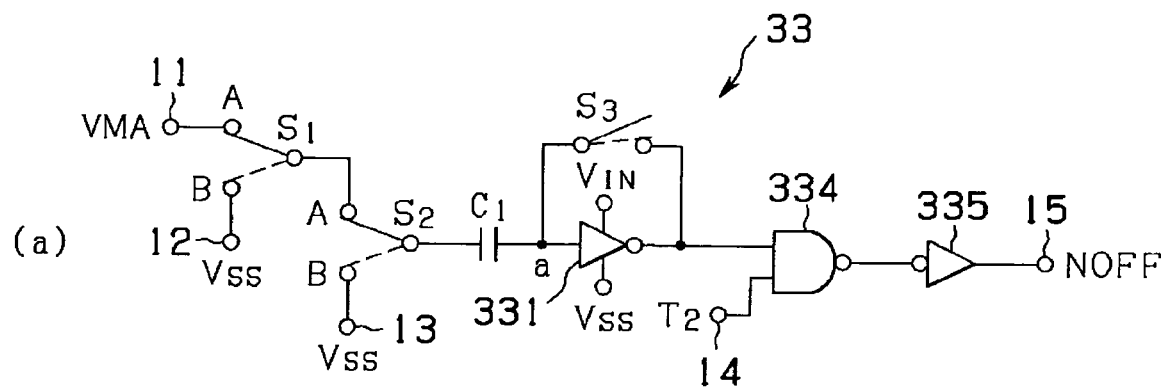
FIG. 10 is a drawing showing an example of a configuration of the detection circuit shown in FIG. 5, illustrating the circuit diagram thereof and timings for S1 to S3 switches to switch from one to another.

FIG. 10 shows an example of a configuration of the above detection circuit 33. FIG. 10(a) is a circuit diagram thereof, and FIG. 10(b) is a drawing illustrating the switching timings for the switches S1 to S3. Here, an example using a one-stage inverter (331) is illustrated.

The detection circuit 33 includes an input end 11 for inputting the intermediate node potential VMA, switches S1 and S2, a coupling capacitor C1, an inverter 331, a switch S3, a two-input NAND gate 334, an inverter 335, and an output end 15 for outputting the detection signal NOFF. The inverter 331 is driven with the power source voltage V IN (=VDD) and the reference voltage VSS. The switches S1 and S2 are two-input switching switches, each having input ends A and B, and the switch 3 is an "on"/"off" switching switch connected in parallel with the inverter 331 between the input and output ends of it.

The intermediate node potential VMA is input to the input end 11 and then to an input point 'a' of the inverter 331 via the switches S1 and S2 and further the coupling capacitor C1 during the period T2. At that time, since the switch 3 is open, the signal at the input point 'a' will be reversed and input to one input end of the NAND gate 334, and then NAND is established between the input signal and a high-level signal indicating the period T2 supplied to the other input end 14 of the NAND gate 334. Furthermore, the signal is then output as the detection signal NOFF to the output end 15 through the inverter 335. Also, in the period T1, input to the input end of the coupling capacitor C1 is set to the VSS level, and the above switch S3 is closed.

The switch S1 is provided to turn the output end of the switch S2 to the VSS level in order to prevent the power supply voltage VIN from affecting on the subsequently provided portions of the circuit via the output end of the switch S1 when the input voltage VMA becomes VIN (=VDD) in the period T1.

Moreover, the above NAND gate 334 and the inverter 335 are added as gates so as to further digitize a binary signal, which was produced by binarizing the variation of the analog signal VMA by the inverter 331 in the period T2.

Either the intermediate node potential VMA input to the input terminal 11 or the reference potentials VSS input to the terminals 12 and 13, are input in response to switching of the switches S1 and S2 corresponding to the period T2 and T1 and supplied to the input end of the coupling capacitor C1.

Figure 11:
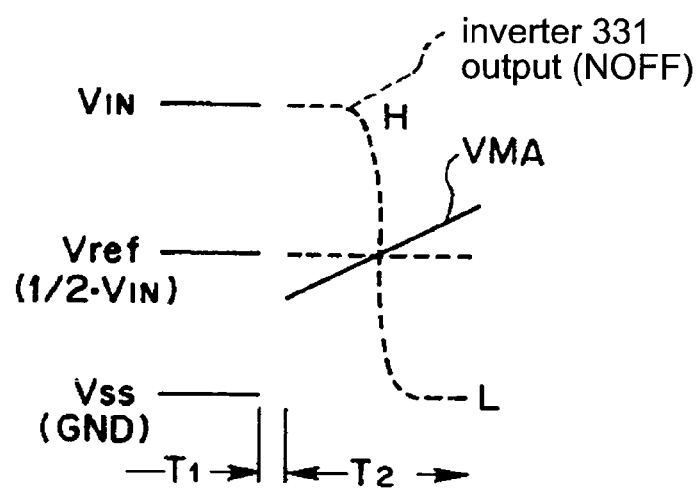
FIG. 11 is a drawing showing the detection signal N "OFF" shown in FIG. 10.

Thus, firstly, in the period T1, VSS is input, and the input and output of the inverter 331 are short-circuited, so that the operating level at the input point 'a' of the inverter 331 falls within VIN/2(=Vref). Under this condition, the VMA experiences an undershoot and becomes a voltage slightly lower than the VSS when the low side transistor (QN1) is turned "on" at the timing of the period T2 as shown in FIG. 11. This voltage is transmitted to the input point 'a' of the inverter 331 by capacitance coupling of the capacitor C1, so that the input point 'a' of the inverter 331 receives an input level lower than a threshold value Vref (=VIN/2). Then, the reverse output of the inverter 331 is high (H)-level and thereafter turns to low (L)-level when the VMA exceeds the Vref.

In other words, in the period T2, the detection signal NOFF obtained at the output end 15 is output shifted from high to low in accordance with changes of the VMA with respect to the VSS level.

Figure 12:
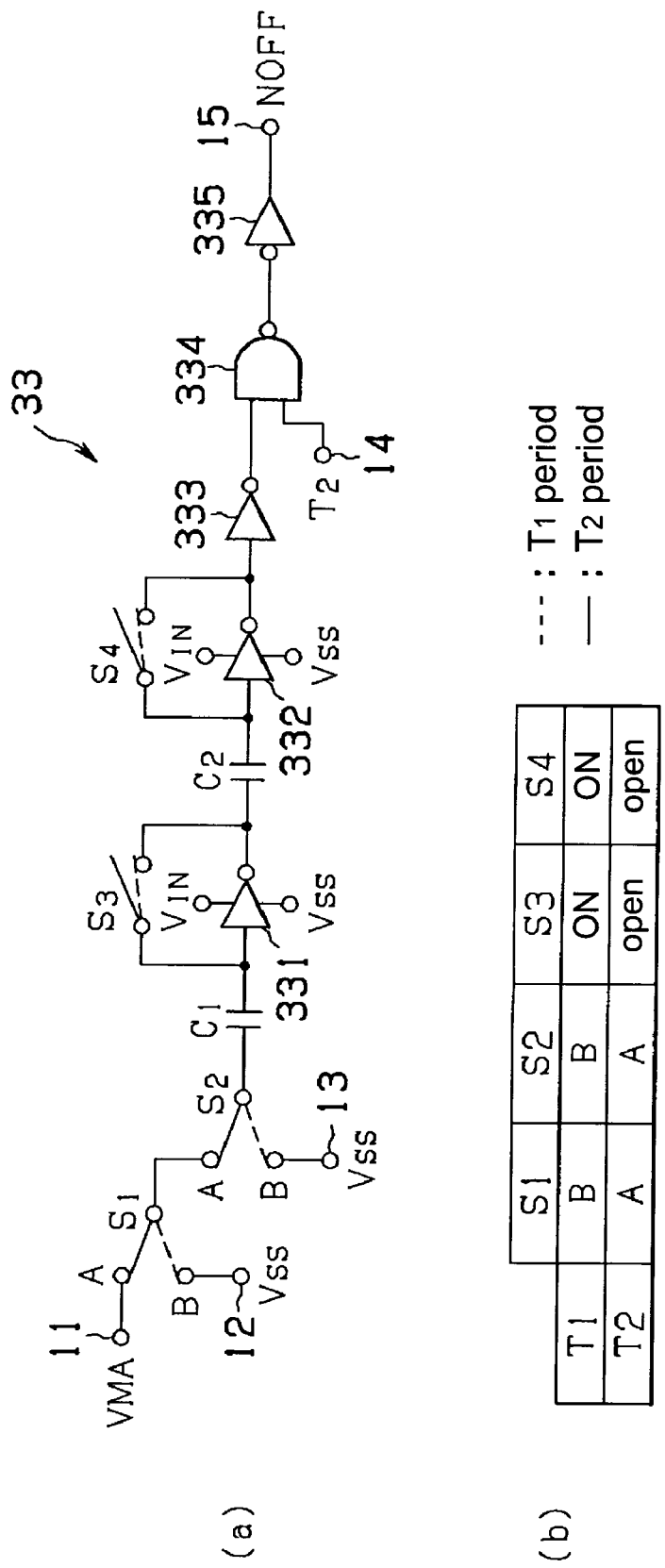
FIG. 12 is a drawing another example of a configuration of the detection circuit shown in FIG. 5, illustrating the circuit diagram and timings for S1 to S4 switches to switch fro one to another.
Figure 13:
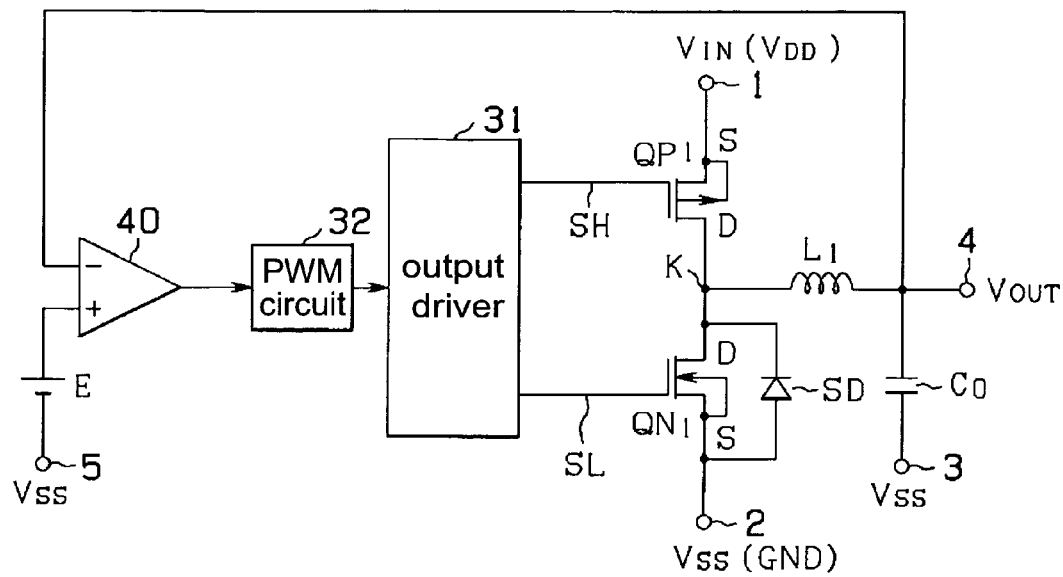
FIG. 13 is a drawing showing a configuration of a power supply circuit of prior art.

FIG. 12 shows another example of a configuration of the above detection circuit 33. FIG. 12(a) is a circuit diagram thereof, and FIG. 12(b) is a drawing illustrating switches timings for S1 to S4 shown in FIG. 12(a). Here, an example using a two-level inverter (331 and 332) is described. The switches S1 and S2 are two-input switching switches each having input ends A and B, and the switch S3 and S4 are "on"/"off" switching switches.

In the example of FIG. 12, a coupling capacitor C2 and inverters 332 and 333 are added as stages subsequent to the inverter 331 of the structure shown in FIG. 10, and the switch 4 is connected in parallel with the inverter 332 between the input and the output of switching 4. The inverter 332 is driven similar to inverter 331. The inverter 333 connected between the inverter 332 and the NAND gate 334 is interposed so as to adjust the polarity of the signal in the circuit if FIG. 10. Also, similarly to the case of FIG. 10, the NAND gate 334 and the inverter 335 are gates added in order to further convert into a digital signal the signal which is produced by binarizing the variation of the analog signal VMA by means of the inverter 331 and 332 in the period T2.

Accordingly, the circuit in FIG. 12 obtains high gain by installing two stages of the inverters and operates in the same manner as explained with FIG. 10.

According to the second embodiment described above, it is possible to reduce wasteful electric current consumption at the time of driving the low side transistor as well as the through current as explained in the first embodiment (prohibiting the high side and low side transistors to operate simultaneously). Therefore, further reduction of power consumption is realized.

The invention is not limited to the above embodiments and is applicable to embodiments, which can be varied without departing from the spirit of the invention.

According to the invention described above, it is possible to prevent a through current between a high side transistor and a low side transistor and to provide a switching-type power supply circuit, which can raise conversion efficiency.

What is claimed is:

1. A power supply circuit comprising:
   a DC—DC conversion circuit including a high side transistor and a low side transistor connected in series between a power supply voltage and a reference potential and producing a direct current output voltage as a PWM controlled output which is obtained by turning "on" and "off" each of the transistors with each PWM signal;
   a detection circuit for detecting a level of an intermediate node potential at a junction point of the high side transistor and the low side transistor after turning "off" the high side transistor, wherein the detection circuit is directly connected to the high side transistor and the low side transistor at the junction point so as to directly detect the intermediate node potential therefrom, wherein the detection circuit includes:
   switching circuitry that selectively switches the intermediate node potential or the reference potential; and
   inverter circuitry that receives either the intermediate node potential or the reference potential from the switching circuitry and provides a detection signal to the DC—DC conversion circuit when the intermediate node potential becomes below or equal to a predetermined potential; and
   means for turning "on" the low side transistor when the intermediate node potential becomes below or equal to a predetermined potential.

2. A power supply circuit comprising:
   a DC—DC conversion circuit including a high side transistor and a low side transistor connected in series between a power supply voltage and a reference potential and producing a direct current output voltage as PWM controlled output which is obtained by turning "on" and "off" each of the transistors with each PWM signal;
   means for obtaining an amount of error by comparing the output from the DC—DC conversion circuit to a predetermined reference voltage value;
   means for producing a PWM signal of which a pulse width is controlled by the amount of error;
   means for supplying the PWM signal to each gate of the transistors in the DC—DC conversion circuit;
   a detection circuit for detecting a level of an intermediate node potential at a junction point of the high side transistor and the low side transistor after the high side transistor is turned "off", wherein the detection circuit is directly connected to the high side transistor and the low side transistor at the junction point so as to directly detect the intermediate node potential therefrom, wherein the detection circuit includes:
   switching circuitry that selectively switches the intermediate node potential or the reference potential; and
   inverter circuitry that receives either the intermediate node potential or the reference potential from the switching circuitry and provides a detection signal to the DC—DC conversion circuit when the intermediate node potential becomes below or equal to a predetermined potential; and
   means for turning "on" the low side transistor when the intermediate node potential becomes below or equal to a predetermined potential.

3. The power supply circuit according to claim 1, wherein the detection circuit outputs a signal for turning "on" the low side transistor when detecting the intermediate node potential lowered to the predetermined potential, which is sufficiently low with respect to the power supply voltage.

4. The power supply circuit according to claim 1, wherein the detection circuit receives the intermediate node potential by a (VDD/2) type logic circuit when setting the power supply voltage to VDD and the reference potential to zero, and outputs a signal for turning "on" the low side transistor when detecting the intermediate node potential lowered to a potential below or equal to (VDD/4).

5. A power supply circuit comprising:
   a DC—DC conversion circuit including a high side transistor and a low side transistor connected in series between a power supply voltage and a reference potential and producing a direct current output voltage as PWM controlled output which is obtained by turning "on" and "off" each of the transistors with each PWM signal;
   means for obtaining an amount of error by comparing the output from the DC—DC conversion circuit to a predetermined reference voltage value;
   means for producing a PWM signal of which a pulse width is controlled by the amount of error;
   means for supplying the PWM signal to each gate of the transistors in the DC—DC conversion circuit;
   a detection circuit for detecting a level of an intermediate node potential at a junction point of the high side transistor and the low side transistor after the high side transistor is turned "off", wherein the detection circuit is directly connected to the high side transistor and the low side transistor at the junction point so as to directly detect the intermediate node potential therefrom, wherein the detection circuit includes:
   switching circuitry that selectively switches the intermediate node potential or the reference potential; and
   inverter circuitry that receives either the intermediate node potential or the reference potential from the switching circuitry and provides a detection signal to the DC—DC conversion circuit when the intermediate node potential becomes below or equal to a predetermined potential;
   PWM signal level detection means for detecting a level of a PWM signal to be supplied to the gate of the low side transistor out of the PWM signals to be supplied to the DC—DC conversion circuit;
   means for turning "on" the low side transistor when the detection circuit detects the intermediate node potential lowered below or equal to a predetermined potential; and
   means for turning "on" the high side transistor after the PWM signal level detection means detects the level of the PWM signal to be supplied to the gate of the low side transistor lowered below or equal to a predetermined potential.

6. The power supply circuit according to claim 5, wherein the detection circuit outputs a signal for turning "on" the low side transistor when detecting the intermediate node potential lowered to the predetermined potential which is sufficiently low with respect to the power supply voltage, and the PWM signal level detection means outputs a signal for turning "on" the high side transistor when detecting the PWM signal to be supplied to the gate of the low side transistor lowered to the predetermined potential which is sufficiently low with respect to the power supply voltage.

7. The power supply circuit according to claim 5, wherein the detection circuit receives the intermediate node potential at a (VDD/2) type logic circuit when setting the power supply voltage to VDD and the reference voltage to zero and outputs a signal for tuning on the low side transistor when detecting the intermediate node potential lowered to a potential below or equal to (VDD/4), and the PWM signal level detection means receives the PWM signal to be supplied to the gate of the low side transistor at a (VDD/2) type logic circuit when setting the power supply voltage to VDD and the reference voltage to zero and outputs a signal for turning "on" the high side transistor after detecting the level of the PWM signal to be supplied to the gate of the low side transistor lowered to a potential below or equal to (VDD/4).

8. The power supply circuit according to claim 2, wherein the detection circuit outputs a detection signal indicating that the intermediate node potential has exceeded the reference potential after returning from an undershoot at a level lower than the reference potential when the low side transistor is turned on during an "off"-period of the high side transistor, wherein means for producing further includes a function of turning "off" the low side transistor being in an on-state by controlling, based on a detection signal of the detection circuit, a pulse width of the PWM signal to be supplied to the gate of the low side transistor out of the PWM signals to be supplied to the DC—DC conversion circuit.

9. The power supply circuit according to claim 1, further comprising an error amplifier that produces an error signal by comparing the output voltage of the DC—DC conversion circuit with a reference voltage value of a reference voltage supply.

10. The power supply circuit according to claim 1, further comprising an output driver for receiving an input of the PWM signal.

11. The power supply circuit according to claim 1, further comprising a rectifier coil and a stabilizing capacitance connected in series between an intermediate node.

12. The power supply circuit according to claim 1, further comprising a diode connected between the source and drain of the low side transistor.

13. The power supply circuit according to claim 1, wherein the output driver forms gate pulses to be supplied to the high side transistor and the low side transistor.

14. The power supply circuit according to claim 1, wherein the high side transistor and the low side transistor have a drain in common.

15. A power supply circuit comprising:
a DC—DC conversion circuit including a high side transistor and a low side transistor connected in series between a power supply voltage and a reference potential and producing a voltage as PWM controlled output which is obtained by turning "on" and "off" each of the transistors with each PWM signal; and
a detection circuit that detects a level of an intermediate node potential at a junction point of the high side transistor and the low side transistor after turning "off" the high side transistor wherein the detection circuit is directly connected to the high side transistor and the low side transistor at the junction point so as to directly detect the intermediate node potential therefrom, wherein the detection circuit includes:
switching circuitry that selectively switches the intermediate node potential or the reference potential; and
inverter circuitry that receives either the intermediate node potential or the reference potential from the switching circuitry and provides a detection signal to the DC—DC conversion circuit when the intermediate node potential becomes below or equal to a predetermined potential; and
a PWM circuit and output driver that turns "on" the low side transistor when the intermediate node potential becomes below or equal to a predetermined potential.

16. The power supply circuit according to claim 15, wherein the PWM circuit and the output driver output a signal for turning "on" the low side transistor when detecting the intermediate node potential lowered to the predetermined potential which is sufficiently low with respect to the power supply voltage.

17. The power supply circuit according to claim 15, wherein the PWM circuit and output driver receive the intermediate node potential by a (VDD/2) type logic circuit when setting the power supply voltage to VDD and the reference potential to zero, and output a signal for turning "on" the low side transistor when detecting the intermediate node potential lowered to a potential below or equal to (VDD/4).

18. The power supply circuit according to claim 2, wherein the detection circuit outputs a signal for turning "on" the low side transistor when detecting the intermediate node potential lowered to the predetermined potential, which is sufficiently low with respect to the power supply voltage.

19. The power supply circuit according to claim 2, wherein the detection circuit receives the intermediate node potential by a (VDD/2) type logic circuit when setting the power supply voltage to VDD and the reference potential to zero, and outputs a signal for turning "on" the low side transistor when detecting the intermediate node potential lowered to a potential below or equal to (VDD/4).

20. The power supply circuit according to claim 5, wherein the detection circuit outputs a detection signal indicating that the intermediate node potential has exceeded the reference potential after returning from an undershoot at a level lower than the reference potential when the low side transistor is turned "on" during an "off" period of the high side transistor, wherein the means for producing further includes a function of turning "off" the low side transistor being in an on-state by controlling, based on a detection signal of the detection circuit, a pulse width of the PWM signal to be supplied to the gate of the low side transistor out of the PWM signals to be supplied to the DC—DC conversion circuit.

\* \* \* \* \*